US005389278A

United States Patent [19]

Minns et al.

[11] Patent Number: 5,389,278

[45] Date of Patent: * Feb. 14, 1995

[54] METHOD FOR REMOVING COFFEE STAINS FROM CARPET

[75] Inventors: Charles R. Minns; Thomas L. Varner, Jr., both of Williamsburg, Va.

[73] Assignee: BASF Corporation, Parsippany, N.J.

[ * ] Notice: The portion of the term of this patent subsequent to Oct. 12, 2010 has been disclaimed.

[21] Appl. No.: 901,467

[22] Filed: Jun. 19, 1992

Related U.S. Application Data

[63] Continuation of Ser. No. 650,353, Feb. 4, 1991, abandoned, which is a continuation-in-part of Ser. No. 462,919, Jan. 8, 1990, Pat. No. 5,252,243, which is a continuation of Ser. No. 206,531, Jun. 14, 1988, abandoned.

[51] Int. Cl.[6] .......... C09K 15/06

[52] U.S. Cl. .......... 252/102; 252/94; 252/99; 252/103; 252/DIG. 19; 134/42

[58] Field of Search .......... 252/95, 99, 104, 156, 252/102, 94, DIG. 19, 103; 134/42

[56] References Cited

U.S. PATENT DOCUMENTS

| | | | |
|---|---|---|---|
| 3,528,115 | 9/1970 | Lawes | 252/103 |
| 3,607,760 | 9/1971 | McIntyre | 252/104 |
| 3,838,967 | 10/1974 | Shepley | 252/103 |
| 4,347,149 | 8/1982 | Smith et al. | 252/102 |
| 4,377,489 | 3/1983 | King | 252/99 |
| 4,497,725 | 9/1986 | Smith et al. | 252/102 |
| 4,539,007 | 9/1985 | Rösch et al. | 252/103 |
| 5,002,684 | 3/1991 | Beck et al. | 252/105 |
| 5,196,134 | 3/1993 | Jackson | 252/103 |
| 5,252,243 | 10/1993 | Minns | 252/102 |

*Primary Examiner*—Stephen Kalafut
*Assistant Examiner*—J. Silbermann
*Attorney, Agent, or Firm*—Karen M. Dellerman

[57] ABSTRACT

An aqueous cleaning composition has a pH of at least about 9.0 and is composed of up to about 30 percent by total composition weight of a wetting agent containing 1 to about 5 carbon atoms; between about 3 and about 15 percent by total composition weight of a peroxyhydrate oxidizing agent; and a pH adjustment substance.

6 Claims, No Drawings

METHOD FOR REMOVING COFFEE STAINS FROM CARPET

CROSS-REFERENCE TO RELATED APPLICATIONS

This is a continuation of application(s) Ser. No. 07/650,353, filed on Feb. 4, 1991, now abandoned, which is a continuation-in-part of Ser. No. 07/206,531, filed Jun. 14, 1988, now abandoned.

FIELD OF THE INVENTION

This invention relates to aqueous cleaning compositions and, more particularly, relates to an aqueous cleaning composition having the ability to remove stains, soils, or combinations thereof from textile fibers.

BACKGROUND OF THE INVENTION

Carpets containing synthetic polymer fibers are a popular floor covering for both residential and commercial applications. Such carpets are relatively inexpensive and have a combination of desirable qualities, such as durability, comfort, safety, warmth, and quietness.

Various types of synthetic polymer fibers are used in making carpets. Two popular synthetic polymer fibers utilized in carpets are polyamide fibers, such as nylon 6, and nylon 6/6, and polyester fibers.

The fibers contained in the carpets are severely and permanently stained or soiled when contacted, such as by inadvertent spilling, with certain artificial and natural colorants present in household items, such as tea, coffee beverages made from coffee beans, and soft drink beverages. Many of these colorants are acid dye colorants, which cause the most severe stains. As a result thereof, carpets are sometimes replaced because of unsightly soiling or staining, even though the carpet has not been worn out.

The terms "stain" and "staining" as used herein with reference to synthetic fibers mean discoloration of the fibers caused by a reaction with a chemical substance. Acid dyes are representative of a staining material for nylon fibers.

The term "soils" as used herein refers to both organic and inorganic matter which comes in contact with fibers and adhere thereto. Dirt particles, grease, oils, foods, and cosmetics are representative of materials referred to as soils that work their way onto and into various textile fibers.

The term "fiber" as used herein includes fibers of extreme or indefinite length (i.e. filaments) and fibers of short length (i.e. staple). The term "yarn" as used herein means a continuous strand of fibers.

In an attempt to prevent undesirable staining of fibers and, particularly, fibers contained in carpets, it has been proposed that the fibers be treated with an additive which coats the fiber and makes the fiber resistant to staining. Examples of such additives are condensation products made from aromatic sulfonic acids, and formaldehyde. Although such additives have been somewhat successful in imparting stain resistance, certain problem remain. For instance, many of the additives reduce staining of fibers, but do not totally eliminate it. In addition, traffic on carpet wears off the additives, which leaves the resulting fibers of the carpet with little or no protection against sing.

Colored food beverages, such as colored soft drink beverages, tea beverages, and coffee beverages made from coffee beans, present a serious staining problem to textile fibers. Coffee stains are particularly unsightly because of their dark brown color. Also, coffee stains are notoriously difficult to remove from many synthetic fibers.

Various fluorochemicals have been applied to carpet fibers in order to reduce their water and oil wettability. The fluorochemical reduces the tendency of soils to adhere to the fibers, thereby making the removal of soils from the carpet fibers easier than if the fluorochemicals were omitted, but offers little protection to the carpet fibers from spills containing acid dye colorants unless the colorants are immediately removed from the fibers. In addition, traffic on the carpet wears off the fluorochemicals.

A number of cleaning solutions have been proposed in the past for removing stains and soils from fibers. For instance, volatile solvent dry-cleaning fluids have been proposed, but such fluids are less than satisfactory in removing water-soluble stains or soils. In addition, aqueous compositions containing synthetic detergents have been proposed for removing stains and soils from fibers, but such compositions have not been found to be particularly effective.

One of the problems with these cleaning solutions is that while they may, at times, loosen and/or disperse the soil, they fail to pick up or retain the soil, which results in the soil being redeposited on the fibers. Furthermore, they are not very effective against difficult stains, such as acid and coffee stains. Still further, since acid and coffee stains are believed to bond chemically with the fiber, aqueous detergent compositions are not particularly effective and many times it is difficult to remove all of the detergent from the fiber surface, even when rinsed with large amounts of water or steam. As a result thereof, the carpet fibers become tacky due to a film of detergent. The film attracts and retains soils, which results in a cleaned carpet that will soil more easily after a cleaning than prior thereto.

The present invention provides a cleaning composition suitable for removing stains and staining from soils from synthetic polymer fibers which overcomes, or at least mitigates, many of the above-described problems.

SUMMARY OF THE INVENTION

Accordingly, the present invention is an aqueous cleaning composition having a pH of at least about 9.0 which contains up to about 30 percent by total composition weight of a wetting agent, between about 3 and about 15 percent by total composition weight of a peroxyhydrate oxidizing agent and a pH adjustment substance.

A second aspect of the invention involves a two-part carpet cleaning solution. The first component contains a wetting agent and a pH adjustment substance and the second component contain a peroxyhydrate and water. The two parts are mixed together prior to cleaning to form a solution having a pH of at least 9 and which is a) up to about 30 percent by weight wetting agent; and b) about 3 to about 15 percent by weight peroxyhydrate.

It is an object of the present invention to provide an improved carpet cleaning composition.

Related objects and advantages will be apparent to one ordinarily skilled in the art after reviewing the following description.

DETAILED DESCRIPTION OF THE PREFERRED EMBODIMENTS

Wetting agents which are suitable in the cleaning composition of the present invention are varied. Generally, preferable wetting agents are miscible with water and organically based. Two classes of useful wetting agents are glycols and lower aliphatic alcohols. Exemplary alcohols include water-soluble alcohols containing up to 5 carbon atoms, such as methyl alcohol, ethyl alcohol, n-propyl alcohol, isopropyl alcohol, sec-butyl alcohol, tert-butyl alcohol. The presently preferred alcohol is isopropyl alcohol. Exemplary glycols include glycerol, ethylene glycol, propylene glycol and trimethylene glycol.

Oxidizing agents that find particular application in the invention include peroxyhydrates. The term "peroxyhydrate", as used herein, means hydrogen peroxide or any compound which, in an aqueous composition, yields hydrogen peroxide. Examples of such compounds include alkali metal peroxides, such as sodium peroxide and potassium peroxide, sodium perborate monohydrate and tetrahydrate, sodium persulfate, sodium percarbonate, sodium peroxydihydrate, various phosphate peroxyhydrates, such as sodium or potassium peroxydiphosphate, potassium carbonate peroxydihydrate, and organic peroxyhydrates such as urea peroxide. The presently preferred oxidizing agent is hydrogen peroxide.

The amount of oxidizing agent and wetting agent utilized in the aqueous cleaning composition may vary over a wide range. For fibers having stains from coffee beverages, the amount of oxidizing agent employed is generally an amount in the range of from about 3 to about 15 percent by weight of aqueous composition and, preferably, about 10 percent by weight of aqueous composition. The amount of wetting agent is preferably present up to about 30 percent by weight of aqueous composition and, more preferably, about 1 to about 5 weight percent based on the weight of the aqueous composition.

The precise manner that the aqueous composition functions to remove soils or stains, particularly coffee stains, is not fully understood and need not be. It is believed that the aqueous composition oxidizes colored high molecular compounds to colorless lower molecular weight compounds. In any case, the observable effect is that the utilization of the aqueous solution containing the peroxyhydrate and wetting agent very effectively removes, or at least substantially reduces, soils and stains, particularly coffee stains, in the fibers. In addition, certain wetting agents, like isopropyl alcohol, appear to assist in the stain and soil removal and promote drying of the cleaned fiber. The cleaning effect occurs without any appreciable detrimental effect to the fibers.

In the practice of the invention, it is desirable that the pH of the aqueous composition be in the range of from about 9.0 to about 12.0 and, more preferably, about 10. The pH can be adjusted using acidic or alkaline compounds well known in the art. Exemplary compounds for adjusting the pH of the composition include sodium hydroxide, potassium hydroxide, ammonium hydroxide, sodium carbonate, trisodium phosphate and tetrasodium pyrophosphate. Other pH adjustment substances useful with the present invention will be apparent to those ordinarily skilled in the art.

The presently preferred aqueous composition has a pH of about 9.6 and comprises hydrogen peroxide present at about 10 percent by weight of aqueous composition and isopropyl alcohol present at about 1 to 5 percent by weight of aqueous composition. Deionized water is preferably the remaining ingredient.

The aqueous composition can be prepared by mixing together the wetting agent, oxidizing agent, and water in any order. Prior to utilizing the composition, its pH will usually have to be adjusted.

More preferably the cleaning agent is initially prepared as a two-component separated system, mixed just prior to application. Composition stability is greatly enhanced through the two-part solution. A first component (Part A) comprises the wetting agent and the pH adjustment substance. The second component (Part B) contains the oxidizing agent and water. Preferably, the water is deionized. The two-part system is quite stable and thereby does not require stabilizers as in other known similar cleaning solutions. Part A preferably contains about 4 percent isopropanol, about 1.3 percent ammonia and about 94.7 percent deionized water. Part B preferably contains about 18.8 percent hydrogen peroxide and about 81.2 percent deionized water.

The two parts may be provided in a number of ways. For example, the parts may be provided in two separate containers and mixed in equal parts (or as required to obtain the desired final formulation) in a third container soon before use. The mixture is then applied to the stained material according to the method described herein. Alternatively, the two parts may be supplied in a single partitioned container where the partition prevents the parts from mingling prior to use. This type of container may be fitted with a spray nozzle which draws from each part and mixes the parts in the spray. Advantageously, this type of nozzle is provided with one-way valves to prevent the mixed solution from flowing back into the receptacles. Also, the two pans can be separately sprayed in appropriate volumes directly onto the stain.

The method of cleaning using the cleaning composition comprises applying the aqueous composition to the fibers to be cleaned and removing the residue of the composition together with stain, soil, or combinations thereof. The residue may be removed by rinsing scrubbing, vacuuming, sweeping, brushing, and the like. The mount of aqueous composition applied will depend on the severity of the staining or soiling encountered. For severe staining or soiling, more than one application of the cleaning composition may be desired. In addition, the cleaning composition should remain on the fibers for a period of time that ensures proper cleaning of the stains, soils, or combinations thereof. After removing the composition from the fibers, the fibers may be washed with water to thoroughly remove the cleaner.

A desirable feature of utilizing the composition for cleaning soiled and/or stained fibers is that efficacious cleaning occurs thereon without leaving a residue. In addition, the use of the cleaning composition does not impair the color, even dyed colors, of the fibers.

Generally, any synthetic fiber may be cleaned utilizing the cleaning composition of the present invention. Examples of such fibers include those made from synthetic thermoplastic polymers which are capable of being formed into fibers such as by melt extrusion including polyolefins, for example, homopolymers of olefins such as low-density polyethylene, high-density polyethylene, polypropylene, and the like. Copolymers of olefins with other ethylenically unsaturated monomers such as ethylene-propylene copolymers and ethylenebutene copolymers and the like find particular application in the present invention.

Fibers made from polyamides also find particular application in the present invention. Examples of such polyamides include homopolyamides and copolyamides which are obtained by the polymerization of lactam or aminocaprionic acid or a copolymerization product from mixtures of diamines together with dicarboxylic acids or mixtures of lactams.

Typical polyamides include nylon 6, nylon 6/6, nylon 6/10, nylon 6/12, nylon 11, nylon 12, copolymers thereof, or mixtures thereof. Polyamides can be also copolymers of nylon 6 or nylon 6,6 and a nylon salt obtained by reacting a dicarboxylic acid component such as terephthalic acid, isophthalic acid, adipic acid or sebacic acid with a diamine such as hexamethylenediamine or 1,4-bisaminomethylcyclohexane.

Fibers made from polyester also find particular application in the present invention. The preferred polyesters are the linear terephthalate polyesters, i.e., polyesters of a glycol containing from 2 to 20 carbon atoms and a dicarboxylic acid component comprising at least about 75 percent terephthalic acid. The remainder, if any, of the dicarboxylic acid component may be any suitable dicarboxylic acid such as sebacic acid, adipic add, isophthalic acid, sulfonyl-1, 4-4-dibenzoic acid, or 2,8-dibenzofurandicarboxylic acid. Examples of linear terephthalate polyesters which may be employed include poly(ethylene terephthalate), poly(butylene terephthalate), poly(ethylene terephthalate/5-chloroisophthalate), poly(ethylene terephthalate), poly(butylene terephthalate), poly(ethylene terephthalate/5,-chloroisophthalate), poly(ethylene terephthalate/5-[sodium sulfo]-isophthalate), and poly(cyclohexane-1, 4-dimethylene terephthalate/hexahydroterephthalate).

Fibers comprising polyacrylonitrile homopolyers and copolymers can also be utilized in the present invention. The term "polyacrylonitrile" as used herein means a synthetic polymer composed of at least 85 percent by weight acrylonitrile monomer units.

$$(-CH_2-\underset{\displaystyle CN}{\underset{|}{CH}}-).$$

Up to 15 percent of the polymer can be comprised of a vinyl monomer which is copolymerizable with acrylonitrile such as methyl acrylate, methyl methacrylate, vinyl acetate, and vinyl derivatives containing sulfo or carboxyl groups.

The invention is further-exemplified by the examples below, which are presented to illustrate certain specific embodiments of the invention, but are not intended to be construed so as to be restrictive of the spirit and scope thereof. In the following examples, parts are parts volume.

EXAMPLE 1

A cleaning solution is prepared by mixing 139 parts deionized water, 51 parts of 35 percent hydrogen peroxide and 5 parts of 99 percent isopropyl alcohol. The pH of this solution is adjusted to 10 with saturated (29.4%) aqueous ammonia. The solution is placed in a spray bottle.

An amount of 10 milliliters of a beverage comprising black coffee which has a temperature of 180° F. is poured into the center of each piece of a 6-inch by 6-inch sample of a carpet. The samples comprise nylon 6, polyester, and polypropylene. The samples are then allowed to air dry at ambient temperatures for a period of 72 hours. After 72 hours, each stain is sprayed with a commercial carpet detergent. The detergent is allowed to contact the sample for a period of one minute. Thereafter, the detergent is removed from the sample using a commercial hot water extraction machine having a 4-inch wand attached to a vacuum hose. The coffee stains are not appreciably removed from the samples after this treatment.

Thereafter, each coffee stain is sprayed with the cleaning solution prepared above. Stains are no longer visible after several hours. The solution is then extracted from the samples. Upon visual observation, approximately all traces of the coffee stain are removed from each sample. The ΔE of each sample is measured according to CIE L*a*b standard procedure and is summarized in the following Table 1.

TABLE 1

| Sample | ΔE |
|---|---|
| Unstained nylon | 0.00 |
| Stained nylon | 15.57 |
| Treated nylon | 0.97 |
| Unstained polypropylene | 0.00 |
| Stained polypropylene | 6.23 |
| Treated polypropylene | −0.78 |
| Unstained polyester | 0.00 |
| Treated polyester | 0.56 |

EXAMPLE 2

A two-part solution is prepared as follows:

Part A:

90 parts deionized water and 5 parts 99 percent isopropyl alcohol are mixed together. The pH is adjusted to 12 with saturated (29.4%) aqueous ammonia.

Part B:

49 pans of deionized water and 51 pans of 35 percent hydrogen peroxide are mixed together.

6-inch by 6-inch nylon 6, nylon 6/6, polyester and polypropylene carpet samples are stained according to the procedure in Example 1.

Part A and Part B are combined in equal parts just prior to use in the stain removal procedure of Example 1. Approximately no visible coffee stain is left on the samples.

Although certain preferred embodiments of the invention have been herein described for illustrative purposes, it will be appreciated that various modifications and innovations of the procedures recited may be effected without departure from the basic principles which underlie the invention. Changes of this type are therefore deemed to He within the spirit and scope of the invention except as may be necessarily limited to the mended claims of reasonable equivalents thereof.

What is claimed is:

1. A method of spot removing coffee stains from a synthetic polymer fiber carpet comprising:

contacting said carpet with an amount effective to remove the coffee stains of an aqueous cleaning composition having predominantly throughout said contacting a pH of at least 9 and comprising:

(a) up to about 30 percent by total composition weight of a water-soluble wetting agent selected from the group of aliphatic alcohols; glycols, and mixtures thereof;

(b) between about 3 and about 15 percent by total composition weight of a peroxyhydrate oxidizing agent; and (c) a pH adjustment substance.

2. The method of claim 1 wherein said wetting agent is a water-soluble alcohol selected from the group of methyl alcohol, ethyl alcohol, n-propyl alcohol, isopropyl alcohol, sec-butyl alcohol, tert-butyl alcohol, and mixtures thereof, or a glycol selected from the group of glycerol, ethylene glycol, propylene glycol, trimethylene glycol and mixtures thereof.

3. The method of claim 1 wherein said peroxyhydrate is selected from the group of hydrogen peroxide, sodium peroxide, potassium peroxide, sodium perborate monohydrate, sodium perborate tetrahydrate, sodium persulfate, sodium percarborate, sodium peroxydihydrate, sodium peroxydiphosphate, potassium peroxydiphosphate, potassium carbonate peroxydihydrate, urea peroxide, and mixtures thereof.

4. The method of claim 1 where said synthetic polymer fibers are selected from a group consisting of polyamide, polyester, and polyolefin fibers.

5. A method of spot removing coffee stains from a synthetic polymer fiber carpet comprising:

contacting said carpet with an amount effective to remove the coffee stains of an aqueous cleaning composition having predominantly throughout said contacting a pH of at least 9 and comprising:

(a) from about 1 up to about 5 percent by total composition weight of a water-soluble wetting agent selected from the group of aliphatic alcohols; glycols, and mixtures thereof;

(b) between about 10 and about 15 percent by total composition weight of a peroxyhydrate oxidizing agent; and (c) a pH adjustment substance.

6. The method of claim 5 wherein said peroxyhydrate is hydrogen peroxide, said wetting agent is isopropyl alcohol and said pH is adjusted to about with ammonium hydroxide.

* * * * *

UNITED STATES PATENT AND TRADEMARK OFFICE
CERTIFICATE OF CORRECTION

PATENT NO. : 5,389,278

DATED : February 14, 1995

INVENTOR(S) : Charles R. Minns, Thomas L. Varner, Jr.

It is certified that error appears in the above-identified patent and that said Letters Patent is hereby corrected as shown below:

At column 1, line 62, please insert an "s" after "problem".

At column 1, line 66, please delete the last word "sing" and replace with "staining".

At column 8, line 20, please insert "10" after "about".

Signed and Sealed this

Twentieth Day of June, 1995

Attest:

BRUCE LEHMAN

*Attesting Officer* *Commissioner of Patents and Trademarks*